W. A. STEWART.
HUB NUT.
APPLICATION FILED OCT. 13, 1909.
965,490.
Patented July 26, 1910.
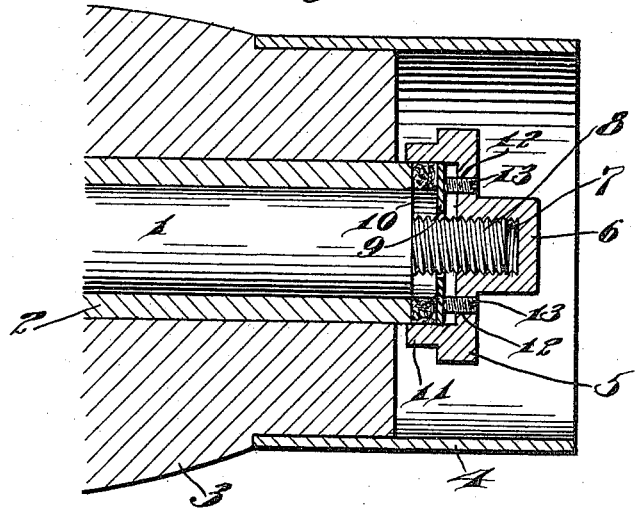
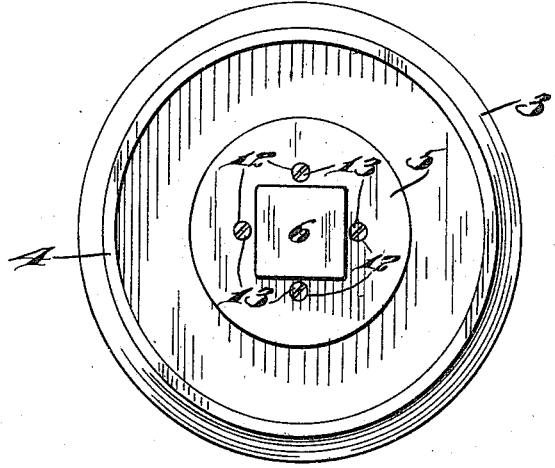
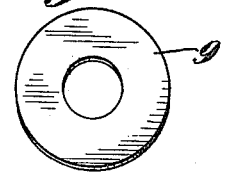
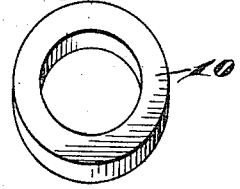
Witnesses
Inventor
William A. Stewart,
By Joshua R. H. Potts
Attorney
THE NORRIS PETERS CO., WASHINGTON, D. C.

UNITED STATES PATENT OFFICE.

WILLIAM A. STEWART, OF PHILADELPHIA, PENNSYLVANIA.

HUB-NUT.

965,490.  Specification of Letters Patent.  Patented July 26, 1910.

Application filed October 13, 1909. Serial No. 522,386.

*To all whom it may concern:*

Be it known that I, WILLIAM A. STEWART, a citizen of the United States, residing at Philadelphia, in the county of Philadelphia and State of Pennsylvania, have invented certain new and useful Improvements in Hub-Nuts, of which the following is a specification.

My invention relates to an improved hub-nut, the object of the invention being to provide an improved nut of this character, which is adapted to screw onto the end of the axle spindle, to secure the wheel hub on the spindle, and which is capable of varying adjustments to take up wear and prevent rattling.

A further object is to provide an improved device of this character which is of extremely inexpensive construction, yet strong and durable in use.

With these and other objects in view, the invention consists in certain novel features of construction and combinations and arrangements of parts as will be more fully hereinafter described and pointed out in the claim.

In the accompanying drawings, Figure 1, is a fragmentary view in longitudinal section, illustrating the application of my improvements. Fig. 2, is an end view. Fig. 3, is a detail view of the ring 9, and Fig. 4, is a detail view of the washer 10.

1, represents an ordinary axle spindle, and 2 an ordinary boxing thereon, around which latter an ordinary hub 3 is mounted, and provided at its end with a metal tubular extension 4.

5 represents my improved nut, which is of general cylindrical form, having a central enlargement or extension 6 which is made angular on its exterior to receive an ordinary wrench to adjust the nut. This enlargement 6 is made with an internally screw threaded bore 7 to engage the restricted screw threaded end 8 of spindle 1.

In the nut 5, a metal ring 9 is located and a washer 10, preferably of leather or other suitable material, is interposed between the ring 9 and the end of boxing 2. This washer 10 has an opening which is large enough to admit spindle 1, so that it does not bear against the end of the spindle, but only against the boxing. The circular body portion 11 of the nut receives the end of boxing 2. The nut 5 around the enlargement 6 is provided with a series of screw threaded openings 12, in which screws 13 are mounted. These screws, at their outer ends, preferably lie approximately flush with the surface of the nut, and at their inner ends bear against ring 9, so that when said screws are adjusted, ring 9 and washer 10 will be moved.

When the nut is screwed on to the threaded end of the spindle 1, the washer 10 will bear against the end of the boxing, and as the boxing or the washer wears, the washer may be adjusted by means of the screws 13 to compensate for wear, and a uniform tight bearing is assured.

It will be noted that my improved nut may be utilized with any ordinary form of axle spindle and hub, and it is designed to take the place of ordinary nuts now used, and will to a great extent, obviate rattling, which cannot be prevented with the ordinary nuts.

Various slight changes might be made in the general form and arrangement of parts described, without departing from my invention, and hence I do not restrict myself to the precise details set forth, but consider myself at liberty to make such changes and alterations as fairly fall within the spirit and scope of the appended claim.

Having thus described my invention, what I claim as new and desire to secure by Letters Patent is:—

In combination with an axle spindle having a restricted screw-threaded end, a boxing on said spindle, and a hub on said boxing, of a nut, comprising a body portion of general cylindrical form of an internal diameter greater than the external diameter of the boxing, a central enlargement on said nut having an angular exterior and an internally screw-threaded bore to engage the threads on the spindle end, a metal ring in said nut fitting the recess in the latter and having a central opening but slightly larger than the screw-threaded portion of the spindle, a washer in the recess in said nut between the ring and the end of the boxing, and bearing against the boxing only, said nut having an annular series of screw-threaded openings, and screws in said openings bearing against said ring, substantially as described.

In testimony whereof I have signed my name to this specification in the presence of two subscribing witnesses.

WILLIAM A. STEWART.

Witnesses:
 CHAS. E. POTTS,
 R. H. KRENKEL.